United States Patent
Kim et al.

(10) Patent No.: US 9,639,752 B2
(45) Date of Patent: May 2, 2017

(54) ELECTRONIC APPARATUS AND METHOD

(71) Applicant: SAMSUNG ELECTRONICS CO., LTD., Suwon-si, Gyeonggi-do (KR)

(72) Inventors: Dong Min Kim, Suwon-si (KR); Sang Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 411 days.

(21) Appl. No.: 14/275,033

(22) Filed: May 12, 2014

(65) Prior Publication Data
US 2014/0333748 A1 Nov. 13, 2014

(30) Foreign Application Priority Data
May 13, 2013 (KR) .................. 10-2013-0053656

(51) Int. Cl.
*H04N 5/232* (2006.01)
*G06K 9/00* (2006.01)

(52) U.S. Cl.
CPC ..... *G06K 9/00604* (2013.01); *H04N 5/23219* (2013.01); *H04N 5/23258* (2013.01); *H04N 5/23287* (2013.01)

(58) Field of Classification Search
CPC .......... H04N 5/23219; H04N 5/23258; H04N 5/23287; G06K 9/00604; G06K 9/00221
USPC .......... 348/78, 208.14, 211.99, 333.02, 169, 348/333.01; 396/51, 52, 18, 158; 382/103, 117, 118
See application file for complete search history.

(56) References Cited

U.S. PATENT DOCUMENTS

| | | | | |
|---|---|---|---|---|
| 2008/0205866 A1* | 8/2008 | Sakamoto | ............ | G03B 15/00 396/5 |
| 2009/0079844 A1* | 3/2009 | Suzuki | .................. | G03B 13/36 348/222.1 |
| 2010/0007480 A1* | 1/2010 | Uozumi | .................. | A61B 5/18 340/436 |
| 2010/0073497 A1* | 3/2010 | Katsumata | ......... | G06K 9/00315 348/211.99 |
| 2011/0216181 A1* | 9/2011 | Yoda | .................... | A61B 5/1103 348/78 |
| 2011/0313259 A1* | 12/2011 | Hatakeyama | ............ | A61B 5/18 600/300 |
| 2012/0002843 A1* | 1/2012 | Yoda | .................... | A61B 5/1103 382/103 |
| 2012/0194910 A1* | 8/2012 | Sumioka | ................ | H02P 31/00 359/507 |
| 2012/0293406 A1* | 11/2012 | Park | ...................... | G06F 1/1626 345/156 |
| 2014/0205149 A1* | 7/2014 | Nakamura | ............ | G08B 21/06 382/103 |

* cited by examiner

*Primary Examiner* — Tuan Ho
*Assistant Examiner* — Marly Camargo
(74) *Attorney, Agent, or Firm* — Drinker Biddle & Reath LLP

(57) ABSTRACT

Disclosed herein are an electronic apparatus and method. The electronic includes a photography lens, an eyeball recognition sensor, and a controller. The photography lens acquires an image signal from a subject. The eyeball recognition sensor senses movement of a user's eyeball. The controller recognizes opening and closing of the user's eyelid based on eyeball monitoring information transmitted from the eyeball recognition sensor, and performs a device driving control operation for a reference time period for which the user's eyelid is in a closed state.

16 Claims, 10 Drawing Sheets

ELECTRONIC APPARATUS AND METHOD

CROSS-REFERENCE TO RELATED PATENT APPLICATION

This application claims the priority benefit of Korean Patent Application No. 10-2013-0053656, filed on May 13, 2013 in the Korean Intellectual Property Office, the disclosure of which is incorporated herein by reference.

BACKGROUND

1. Field

Embodiments of the invention relate to an electronic apparatus and method.

2. Description of the Related Art

In general, an image acquisition apparatus including an image acquiring device and a lens focuses on a subject by moving elements associated with an Auto Focus (AF) lens several times to detect a distance at which the subject is in focus, using light that is incident on an image sensor through a lens.

When an camera apparatus including a Liquid Crystal Display (LCD) sets a Continuous Auto Focus (CAF) mode to focus on a subject, the camera apparatus moves a lens and an optical tube assembly according to a CAF algorithm regardless of any requests from a user to show a changing image of the subject to the user, and then outputs a focused image.

SUMMARY

Therefore, it is an aspect of the embodiments to provide an electronic and method for monitoring a user's eyeball, and synchronizing a device driving control period to a time period for which the user's eyelid is closed.

Additional aspects of the embodiments will be set forth in part in the description which follows and, in part, will become obvious from the description, or may be learned by practice of the embodiments.

In accordance with an embodiment, an electronic apparatus includes: a photography lens that acquires an image signal from a subject; an eyeball recognition sensor that sensors movement of a user's eyeball; and a controller that recognizes opening and closing of the user's eyelid based on eyeball monitoring information transmitted from the eyeball recognition sensor, and performs a device driving control operation for a reference time period for which the user's eyelid is in a closed state.

The controller may include: an eyeball movement period calculator that collects the eyeball monitoring information transmitted from the eyeball recognition sensor, and calculates the reference time period for which the user's eyelid is in the closed state; and an operation processor that performs the device driving control operation for the reference time period for which the user's eyelid is in the closed state, when that controller recognizes that the user's eyelid is in the closed state based on the eyeball monitoring information transmitted from the eyeball recognition sensor.

In accordance with another embodiment, an image processing method includes: setting a photographing mode on an electronic apparatus; sensing, by an eyeball recognition sensor, opening and closing of a user's eyelid; performing a device driving control operation for a reference time period for which the user's eyelid is in a closed state based on results of the sensing by the eyeball recognition sensor; and outputting through a display unit image processing results of the device driving control operation, when the reference time period for which the user's eyelid is in the closed state has elapsed.

After the sensing of the opening and closing of the user's eyelid and before the performing of the device driving control operation, the image processing method may further include calculating an average value of time periods for which the user's eyelid is in an opened state and time periods for which the user's eyelid is in the closed state in a predetermined time period, and setting the average value as the reference time period for which the user's eyelid is in the closed state.

In accordance with another embodiment, an electronic apparatus includes: a photography lens that acquires an image signal from a subject; an eyeball recognition sensor that senses movement of a user's eyeball; and a controller that recognizes opening and closing of a user's eyelid based on eyeball monitoring information transmitted from the eyeball recognition sensor, and performs a device driving control operation from when the controller recognizes that the user's eyelid has been closed until the controller recognizes that the user's eyelid has been opened.

The controller may include an eyeball recognition unit that recognizes that the user's eyelid has been closed when a degree by which a user's eyelid is closed is greater than a first reference value, based on eyeball monitoring information transmitted from the eyeball recognition sensor. The eyeball recognition unit also recognizes that the user's eyelid has been opened when a degree by which a user's eyelid is opened is greater than a second reference value after it is recognized that the user's eyelid has been closed.

According to the electronic apparatuses and method as described above, by monitoring a user's eyeball, performing control operations when the user's eyelid is in a closed state (including an Auto Focusing (AF) operation), and providing a finally processed image to the user when the user's eyelid is opened, the user can experience fast processing speed.

BRIEF DESCRIPTION OF THE DRAWINGS

These and/or other aspects of the embodiments will become apparent and more readily appreciated from the following description, taken in conjunction with the accompanying drawings of which.

DETAILED DESCRIPTION

Figure 1:
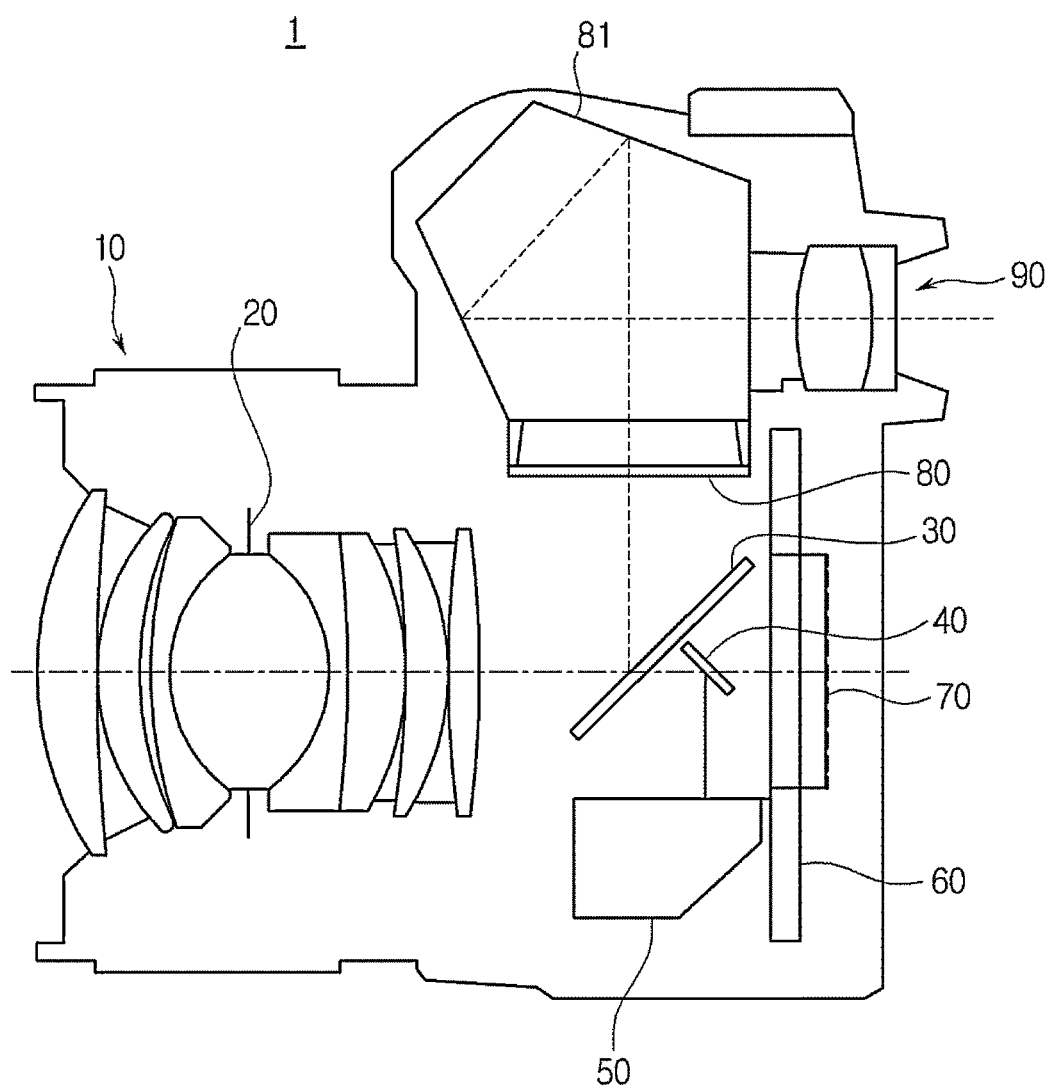
FIG. 1 is a cross-sectional view illustrating a structure of a camera apparatus, according to an exemplary embodiment.

Various features of the embodiments will become apparent from the following detailed description and the accompanying drawings, which are associated with exemplary embodiments. In this specification, the same reference numerals are used throughout the different drawings to designate the same components. Further, when it is determined that the detailed description of the known related art may unnecessarily obscure the description of embodiments, the detailed description will be omitted. Also, it will be understood that, although the terms "first," "second," etc. may be used herein to describe various elements, these elements should not be limited by these terms. These terms are only used to distinguish one element from another.

Hereinafter, exemplary embodiments of the invention will be described in detail with reference to appended drawings.

FIG. 1 is a cross-sectional view illustrating a structure of a camera apparatus, according to an exemplary embodiment. Although a camera is shown in the current embodiment, other embodiments may include mobile phones, PDAs, and other electronic devices having image capturing capabilities.

Referring to FIG. 1, a camera apparatus 1 may include a photography lens 10, an iris 20, a main mirror 30, a sub mirror 40, an Auto Focusing (AF) module 50, a focal-plane shutter 60, an image capturing region 70, a focusing screen 80, a pentaprism 81, and an ocular lens 90.

The photography lens 10 collects light reflected from a subject, and forms an image on the image capturing region 70. The photography lens 10 may include a plurality of lenses. The plurality of lenses may form several optical groups according to their functions.

Also, the photography lens 10 may include an image stabilizer (not shown), and an AF driver (not shown). The image stabilizer prevents image quality from deteriorating due to a user's hand shake. The AF driver receives AF information from the AF module 50, and adjusts the focus of the photography lens 10 based on the AF information.

Meanwhile, the photography lens 10 may include the iris 20. The iris 20 may adjust the amount of light passing through the photography lens 10 and image density. More specifically, when increasing the diameter of the iris 20 so as to pass a greater amount of light through the iris 20, a user can acquire brighter images. However, since increasing the diameter of the iris 20 results in a larger aperture, image density is lowered. Meanwhile, when reducing the diameter of the iris 20 so as to pass a smaller amount of light through the iris 20, the user can acquire darker images. Also, since reducing the diameter of the iris 20 results in a smaller aperture, image density can be relatively enhanced compared to when increasing the diameter of the iris 20.

Since the iris 20 is disposed between lenses, an image with respect to the iris 20 may be formed by the lenses. A virtual image with respect to the iris 20, formed by lenses arranged in front of the iris 20 (i.e., between the iris 20 and the subject), is called an entrance pupil, and a virtual image with respect to the iris 20, formed by lenses arranged behind the iris 20 (i.e., between the iris 20 and the image capturing region 70), is called an exit pupil. Particularly, the exit pupil greatly affects the brightness of an image, and accordingly, plays an important role in adjusting brightness and performing an AF function.

The main mirror 30 may transmit a part of light passing through the photography lens 10 and reflect the remaining part of the light. More specifically, the main mirror 30 reflects a part of light passing through the photography lens 10 toward the focusing screen 80 so that the user can see the light through the ocular lens 90. The remaining part of light transmitted through the main mirror 30 is used to detect a focal point.

The camera apparatus 1 (e.g., a Digital Single Lens Reflex (DSLR) camera) may perform Through-The-Lens (TTL) functions using the main mirror 30. The TTL functions are to perform TTL viewfinder, TTL distance measuring, TTL light metering, etc., using light passing through the photography lens 10.

In detail, the TTL viewfinder is used to reflect light passing through the photography lens 10 so that a user is able to view an image to be taken through a viewfinder. The TTL light metering is a process to measure the brightness of an image to be taken using light passing through the photography lens 10. That is, the TTL light metering is used for an Auto Exposure (AE) adjustment function.

The TTL distance measuring is a process to adjust a focal point of a subject using light passing through the photography lens 10. That is, the TTL distance measuring is used for an AF function.

The sub mirror 40 reflects light passing through the main mirror 30 such that the light passing through the main mirror 30 is again reflected against the main mirror 30 and then incident on the AF module 50. To do this, the sub mirror 40 is arranged to make an acute angle (ranging from 0° to 90°) with the main mirror 30. As such, the sub mirror 40 is arranged behind the main mirror 30 so as to direct light passing through the main mirror 30 toward the main mirror 30, thereby constituting an optical device. The optical device also acts to provide light to the AF module 50.

The AF module 50 functions to focus on a subject, under the control of a controller (not shown). When the AF module 50 fails to focus on a subject, the AF module 50 transmits a driving signal to a driver (not shown) of the photography lens 10 so as to focus on the subject by the control of the controller.

The focal-plane shutter 60 is installed just in front of the image capturing region 70, which is located proximate or close to a focal plane of the camera body. The focal-plane shutter 60 may include two black curtains or metal layers, coated with rubber and called first and second curtains. The focal-plane shutter 60 operates in a shutter method of opening the first curtain to expose the image capturing region 70 to light and then closing the second curtain to block light from the image capturing region 70 upon image-capturing. Accordingly, the focal-plane shutter 60 can adjust shutter speed using a time difference between a time when the first curtain is opened and a time when the second curtain is closed. Also, the focal-plane shutter 60 can be classified into a horizontal-run type and a vertical-run type according to a direction in which the first and second curtains run. Most of cameras adopt the vertical-run type. Also, the camera apparatus 1 may include a lens shutter, a Thornton shutter, a light value shutter, or the like, other than the focal-plane shutter 60.

The image capturing region 70 may optically sense an image of a subject. When the camera apparatus 1 is a film camera, a film may be placed on the image capturing region 70. And, when the camera apparatus 1 is a digital camera, a plurality of image sensors may be arranged on the image capturing region 70. When the camera apparatus 1 is a DSLR camera, a plurality of image sensors for optically sensing an image of a subject may be arranged on the image capturing region 70. Image sensors for a digital camera may include Charge Coupled Devices (CCD) and Complementary Metal Oxide Semiconductors (CMOS) that operate around the basically same principle.

The focusing screen 80 may include a matte surface and a Fresnel lens. The matte surface may be placed to be optically equivalent to a focal surface upon image-capturing.

Accordingly, the same image as an image to be taken may appear on the matte surface. The Fresnel lens concentrates light passing through the matte surface so as for the user to be able to view a brighter image through the ocular lens 90.

The pentaprism 81 is a pentagonal prism. The pentaprism 81 functions to convert an erect reversed image formed on the focusing screen 80 into an erect non-reversed image. Accordingly, the user can see an image to be taken through a viewfinder in the same form as when he/she sees the corresponding subject with naked eyes. The erect reversed image means an image being in a correct position in an up-down direction but in a reversed position in a left-right direction, and the erect non-reversed image means an image being in a correct position in all directions.

The ocular lens 90 forms a virtual image about 1 meter ahead so that the user can see an image formed on the focusing screen 80. Accordingly, the user can see an image to be taken through the ocular lens 90.

An image processing apparatus 100, which will be described below, may be such a digital camera as the camera apparatus 1 described above, a digital camcorder, a mobile phone having a camera, a notebook having a camera, a Personal Digital Assistant (PDA) having a camera, a Portable Multimedia Player (PMP) having a camera, or any electronic device having image capturing capabilities. However, the image processing apparatus 100 is not limited to the above-mentioned devices, and may be any other device having an eyeball recognition function.

Figure 2:
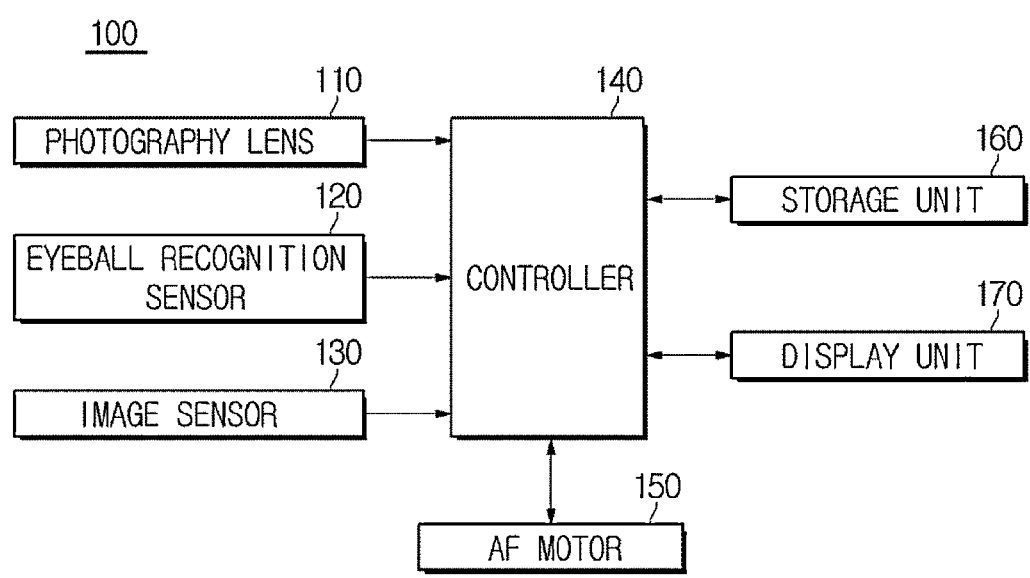
FIG. 2 is a block diagram illustrating an image processing apparatus, according to an exemplary embodiment.
Figure 3:
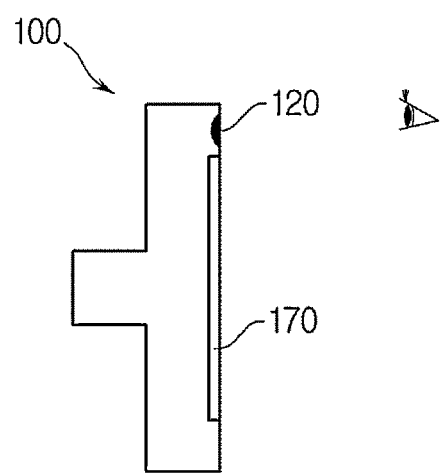
FIG. 3 is a diagram illustrating an image processing apparatus having an eyeball recognition sensor, according to an exemplary embodiment.
Figure 4:
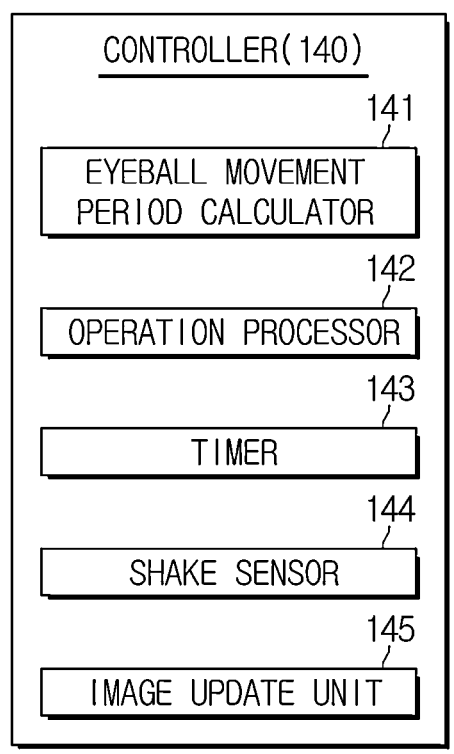
FIG. 4 is a block diagram illustrating a controller of FIG. 2, according to an exemplary embodiment.
Figure 5:
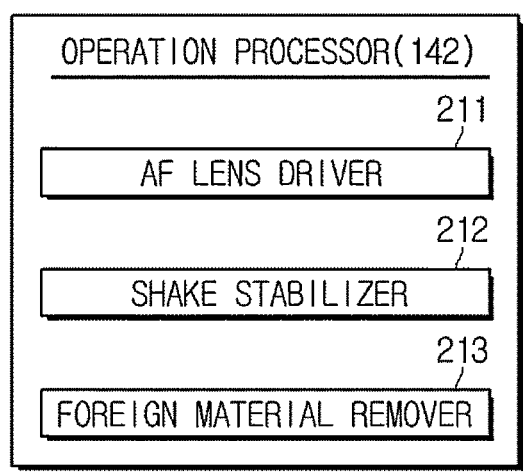
FIG. 5 is a block diagram illustrating an operation processor of FIG. 2, according to an exemplary embodiment.

FIG. 2 is a block diagram illustrating the image processing apparatus 100, according to an exemplary embodiment. FIG. 3 illustrates an image processing apparatus having an eyeball recognition sensor, according to an exemplary embodiment. FIG. 4 is a block diagram illustrating a controller of FIG. 2, according to an exemplary embodiment. FIG. 5 is a block diagram illustrating an operation processor of FIG. 2, according to an exemplary embodiment.

A control method of the image processing apparatus will be described with reference to FIGS. 8, 9, and 10.

Referring to FIG. 2, the image processing apparatus 100 may include a photography lens 110, an eyeball recognition sensor 120, an image sensor 130, a controller 140, an Auto Focus (AF) motor 150, a storage unit 160, and a display unit 170.

The photography lens 110 acquires image signals from a subject. More specifically, the photography lens 110 collects light reflected from the subject, and forms an image on an image capturing region. The photography lens 110 may include a plurality of lenses. The plurality of lenses may form several optical groups according to their functions.

The eyeball recognition sensor 120 may recognize movement of a user's eyeball. More specifically, the eyeball recognition sensor 120 may recognize movement of a user's eyeball, for example, closing and opening of the user's eyelid, using various methods, including a method of photographing a user's face and detecting an eye area image from the user's face image. To do this, as illustrated in FIG. 3, the eyeball recognition sensor 120 may be installed at a specific location of the image processing apparatus 100, at which a user's face can be photographed.

The image sensor 130 may convert light passing through the photography lens 110 into electrical signals. The image sensor 130 may be a Charge Coupled Device (CCD) or a Complementary Metal Oxide Semiconductor (CMOS) sensor. The CCD, which is a recording device using accumulation and transmission of electric charges, can provide high image quality since it responds sensitively to even weak light. Also, the CCD can be highly integrated since it has a simple structure, and is a volatile device with low consumption power. The CCD is easily manufactured by forming a thin oxide layer on a silicon substrate and arranging a plurality of electrodes thereon. Meanwhile, the CMOS, which is an image acquisition device with low consumption power, has $\frac{1}{10}$ power consumption of the CCD, uses a single power source of 3.3V, and can be integrated with peripheral circuits.

The controller 140 may recognize the opening and closing of the user's eyelid based on eyeball monitoring information transmitted from the eyeball recognition sensor 120, and then perform a device driving control operation in a reference time period for which the user's eyelid is in a closed state. The device driving control operation includes all operations for controlling components included in the image processing apparatus 100. For example, the device driving control operation includes operations for controlling components for auto focusing, shake correction, foreign material removal, etc., through movement of an AF lens, which will be described later.

The AF motor 150 may perform auto focusing by moving the AF lens.

The storage unit 160 may store all information related to the image processing apparatus 100.

The display unit 170 is used to output image data photographed through the image processing apparatus 100, and may be a Liquid Crystal Display (LCD). The LCD can display information related to the image processing apparatus 100. For example, the LCD may receive image signals to display images on a screen, display stored still/moving images on a screen, or display various menu screens. However, the display unit 170 is not limited to a LCD, and may be any other display device capable of displaying information.

The LCD needs a backlight since it has no self-luminescence (unlike a Cathode Ray Tube (CRT)), but the LCD has low power consumption due to its low operating voltage and can be easily applied to portable devices. Due to these advantages, the LCD is widely used in various electronic products. The LCD can be classified into a passive-matrix type and an active-matrix type according to its structure. The passive-matrix type includes Super-Twisted Nematic (STN), Double-layer STN (DSTN), Color-STN (CSTN), and the like, based on Twisted Nematic (TN)-LCD. However, the passive-matrix type LCD may have problems, since it has a lower response speed than the active-matrix type LCD, and may have difficulties in obtaining high resolution. Meanwhile, the active-matrix type LCD includes a Thin-Film Transistor (TFT). The TFT LCD may include a lower panel on which TFTs and pixel electrodes are arranged, an upper panel on which color filters representing colors and common electrodes are arranged, and liquid crystals filled between these glass substrates. Polarizers for linearly polarizing visible light (for example, natural light) are respectively attached on the surfaces of the two glass substrates that face each other. Due to the liquid crystals filled between the electrodes on the lower and upper panels, a capacitor and a sub-capacitor are formed so that image information can be stored in the capacitor and the sub-capacitor. By applying a voltage to the gates of TFTs forming pixels to turn on the TFTs, a state in which an image voltage can be applied to the liquid crystals is reached. Then, by applying an image voltage to store image information in the liquid crystals, and then turning off the TFTs, charges stored in the capacitor and the sub-capacitor display an image for a predetermined time period. That is, when a voltage is applied to the liquid crystals, the alignment of the liquid crystals changes, light diffraction occurs when light passes through the liquid crystals in this state, and the diffracted light is transmitted to the polarizers, thereby displaying an image.

Referring to FIG. 4, the controller 140 includes an eyeball movement period calculator 141, an operation processor 142, a timer 143, a shake sensor 144, and an image update unit 145.

The eyeball movement period calculator 141 may collect eyeball monitoring information transmitted from the eyeball recognition sensor 120, and set a reference time period for which an eyelid is in a closed state based on the eyeball monitoring information. More specifically, the eyeball movement period calculator 141 collects information about time periods for which the user's eyelid is in an opened state and time periods for which the user's eyelid is in a closed state in a predetermined time period, and calculates an average value of the time periods to thus set the average value as a reference time period for which the user's eyelid is in a closed state. However, the eyeball movement period calculator 141 may set an arbitrary value input by the user as the reference time period for which the user's eyelid is in a closed state.

For example, referring to FIG. 3, the eyeball movement period calculator 141 collects eyeball monitoring information representing movement of a user's eyeball, for example, closing and opening of the user's eyelid when the user stares at the image processing apparatus 100, through the eyeball recognition sensor 120 illustrated in FIG. 3. The eyeball movement period calculator 141 calculates an average value of time periods for which the user's eyelid is in a closed state and time periods for which the user's eyelid is in an opened state, and thus determines an eyelid blinking period and a reference time period for which the user's eyelid is in a closed state. That is, the reference time period for which the user's eyelid is in the closed state is a reference time period calculated from the user's blinking pattern using the image processing apparatus 100. However, the reference time period for which the user's eyelid is in the closed state may be set to an arbitrary value by the image processing apparatus 100.

When the operation processor 142 recognizes that the user's eyelid has been closed based on the eyeball monitoring information transmitted from the eyeball recognition sensor 120, the operation processor 142 may perform a device driving control operation for the reference time period for which the user's eyelid is in the closed state, starting from when it is recognized that the user's eyelid has been closed.

The timer 143 may count time until the reference time period elapses from when it is recognized that the user's eyelid has been closed, and notify the operation processor 142 of a time when the user's eyelid will be opened. For example, the timer 143 may notify the operation processor 142 of a time period remaining until the user's eyelid is again opened so that the operation processor 152 can perform a device driving control operation in the remaining time period.

The shake sensor 144 may sense shaking of the image processing apparatus 100. As not shown in FIG. 4, the shake sensor 144 may sense shaking of the image processing apparatus 100 using a gyro sensor, an accelerometer, a geomagnetic sensor, an image interpretation algorithm, etc.

When the reference time period for which the user's eyelid is in the closed state has elapsed, the image update unit 145 may output the results of image processing by the device driving control operation that has been performed by the operation processor 142 for the reference time period, through the display unit 170.

Referring to FIG. 5, the operation processor 142 may include an AF lens driver 211, a shake stabilizer 212, and a foreign material remover 213. The AF lens driver 211 may drive the AF motor 150 for the reference time period for which the user's eyelid is in the closed state, starting from when it is recognized that the user's eyelid has been closed, thereby performing auto focusing of an AF lens (not shown).

Figure 8:
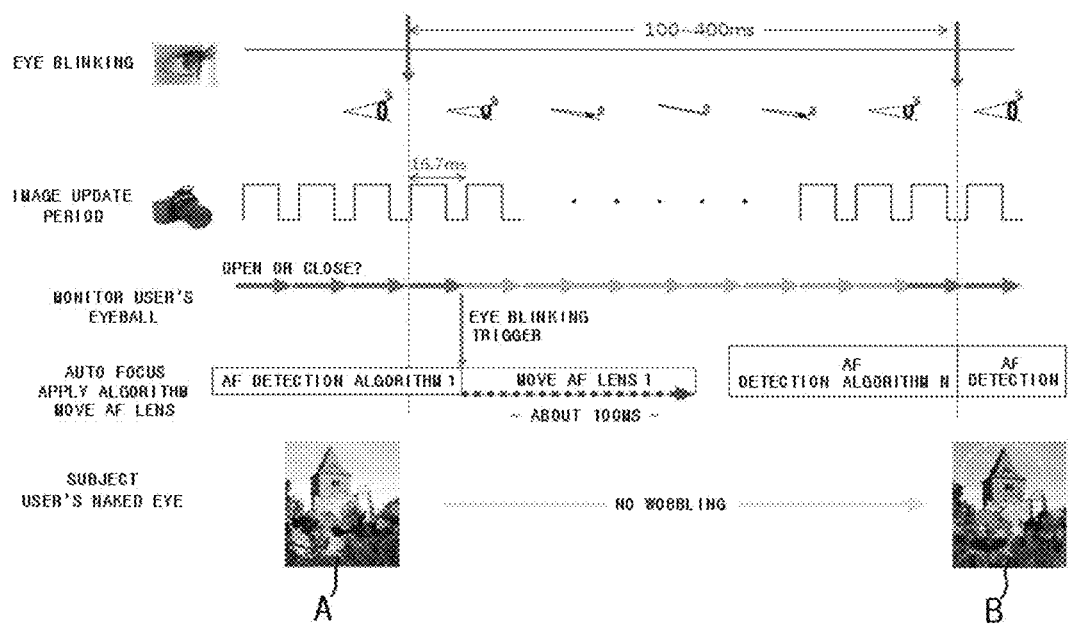
FIGS. 8, 9, and 10 are diagrams illustrating a method of controlling the image processing apparatus, according to various exemplary embodiments.

For example, as illustrated in FIG. 8, the AF driver 211 may move the AF lens while a user's eyelid is closed (for example, for a time period ranging from 100 ms to 400 ms) according to an AF detection algorithm so that the user can see an auto-focused image B when again opening his/her eyelid. That is, when the user's eyelid is opened, an auto-focused image B, not an image A that is not auto-focused, is provided.

When shaking of the image processing apparatus 100 is sensed by the shake sensor 144, the shake stabilizer 212 may correct the shaking using an Optical Image Stabilization (OIS) technique or a Digital Image Stabilization (DIS) technique, for the reference time period for which the user's eyelid is in the closed state, starting from when it is recognized that the user's eyelid has been closed.

Figure 9:
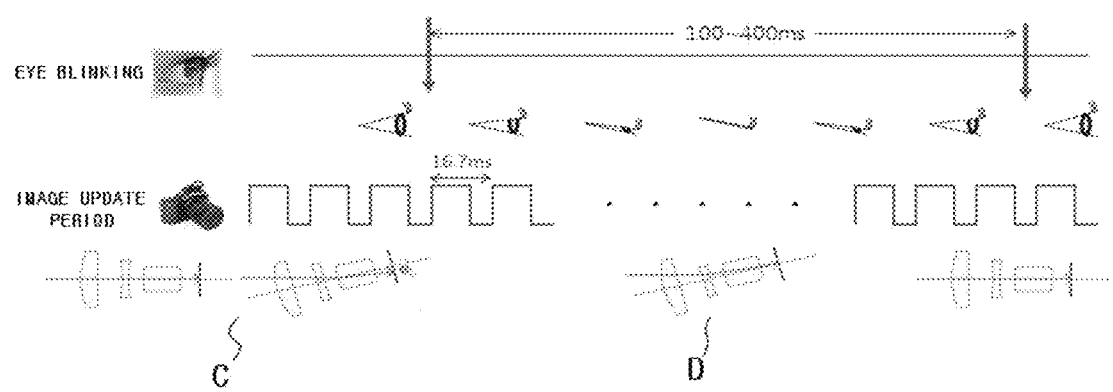

For example, as illustrated in FIG. 9, when an image moves out of focus due to the shaking of the image processing apparatus 100 (C of FIG. 9), the shake stabilizer 212 moves an OIS lens while the user's eyelid is closed to again focus on the image (D of FIG. 9) so that shake correction is completed when the user's eyelid is opened.

The foreign material remover 213 may generate vibration for the reference time period for which the user's eyelid is in the closed state, starting from when it is recognized that the user's eyelid has been closed, thus removing foreign materials. More specifically, the foreign material remover 213 may generate ultrasonic vibration to remove foreign materials such as dust from a photography lens, a CCD surface, a filter, etc., installed in the image processing apparatus 100. However, a method of removing foreign materials from components of the image processing apparatus 100 is not limited to ultrasonic vibration.

Figure 10:
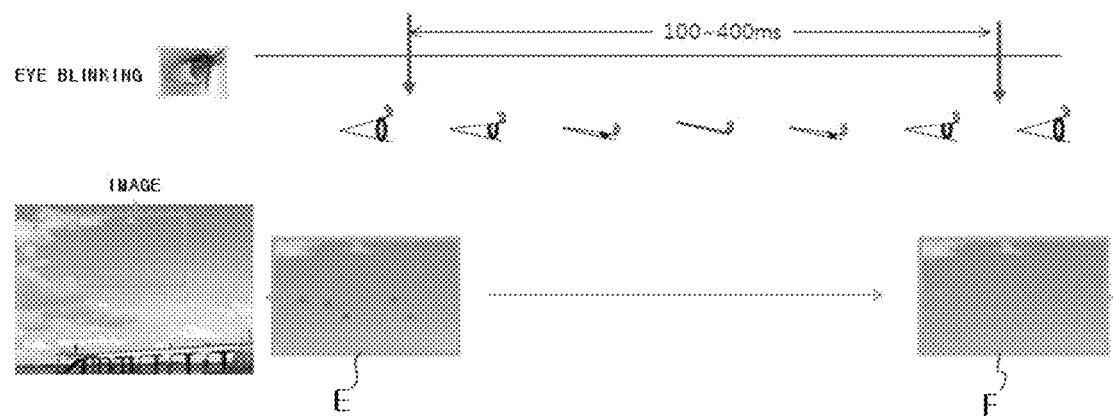

For example, as illustrated in FIG. 10, the foreign material remover 213 may remove dust from the photography lens 110 through a dust reduction function so that a clear image F, not an image E with spots, can be acquired.

Figure 6:
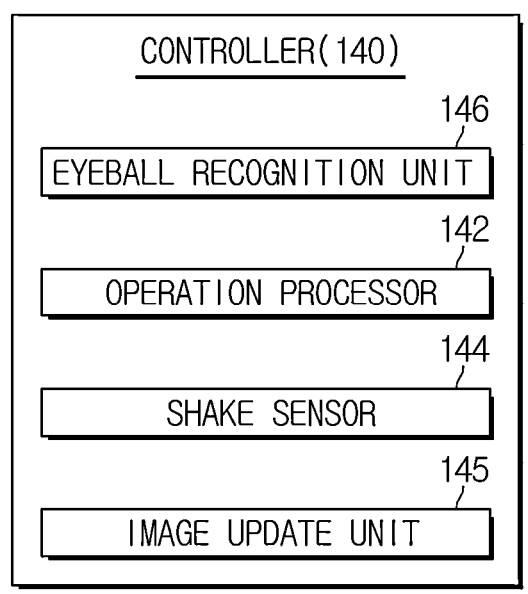
FIG. 6 is a block diagram illustrating a controller of FIG. 2, according to another exemplary embodiment.

FIG. 6 is a block diagram of the controller 140 of FIG. 2, according to another exemplary embodiment.

In the following description, the same components as those illustrated in FIG. 4 will be given the same reference numerals.

The controller 140 may recognize opening and closing of a user's eyelid based on eyeball monitoring information transmitted from the eyeball recognition sensor 120, and perform a device driving control operation for a time period until the user's eyelid is opened after the user's eyelid has been closed.

Referring to FIG. 6, the controller 140 includes an eyeball recognition unit 146, an operation processor 142, a shake sensor 144, and an image update unit 145.

The eyeball recognition unit 146 may recognize that the user's eyelid has been closed when a degree by which a user's eyelid is closed is greater than a first reference value, based on eyeball monitoring information transmitted from the eyeball recognition sensor 120. The eyeball recognition unit 146 may also recognize that the user's eyelid has been opened when a degree by which a user's eyelid is opened is greater than a second reference value, after it is recognized that the user's eyelid has been closed. Here, the first reference value is a reference value for recognizing closing of a user's eyelid based on eyeball monitoring information, and the second reference value is a reference value for recognizing opening of a user's eyelid based on eyeball monitoring information. The first and second reference values may be set as arbitrary values by a user.

The operation processor 142 may perform a device driving control operation until it is recognized that a user's eyelid has been opened, after it is recognized that the user's eyelid has been closed. For example, when the operation processor 142 receives information notifying that the user's eyelid has been closed from the eyeball recognition unit 146, the operation processor 142 may perform a device driving control operation, and then, when the operation processor 142 receives information notifying that the user's eyelid has been opened from the eyeball recognition unit 146, the operation processor 142 may complete the device driving control operation. However, the operation of the operation processor 142 is not limited to this embodiment.

The shake sensor 144 may sense shaking of the image processing apparatus 100. Although not illustrated in FIG. 6, the shake sensor 144 may sense shaking of the image processing apparatus 100 using a gyro sensor, an accelerometer, a geomagnetic sensor, an image interpretation algorithm, etc.

The image update unit 145 may output the results of image processing by the device driving control operation that has been performed by the operation processor 142, through the display unit 170 (see FIG. 2), when the user's eyelid is opened.

Figure 7:
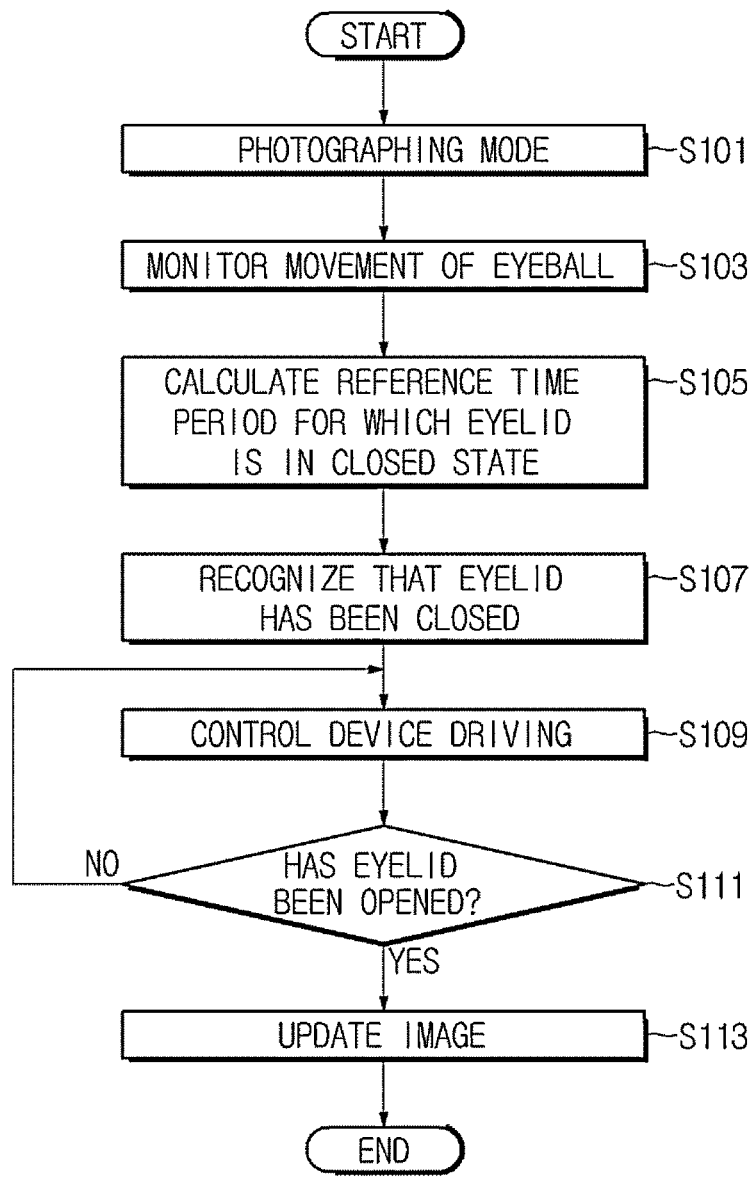
FIG. 7 is a flowchart illustrating a method of controlling an image processing apparatus, according to an exemplary embodiment.

FIG. 7 is a flowchart illustrating a method of controlling the image processing apparatus 100, according to an exemplary embodiment.

First, the image processing apparatus 100 sets a photographing mode (S101).

Then, the image processing apparatus 100 may sense the opening and closing of a user's eyelid through the eyeball recognition sensor 120 (see FIG. 2) (S103).

Then, the image processing apparatus 100 may calculate an average value of time periods for which the user's eyelid is in an opened state and time periods for which the user's eyelid is a closed state, using the time periods collected by the eyeball recognition sensor 120 in a predetermined time period. The image processing apparatus 100 may set the average value to a reference time period for which the user's eyelid is in the closed state (S105).

Alternatively, the image processing apparatus 100 may set an arbitrary value input by a user as the reference time period for which the user's eyelid is in the closed state.

Once the image processing apparatus 100 recognizes that the user's eyelid has been closed (S107), the image processing apparatus 100 may perform a device driving control operation for the reference time period for which the user's eyelid is in the closed state, based on the sensed results of opening and closing of the user's eyelid (S109).

In step S109 of performing the device driving control operation, the image processing apparatus 100 may drive an AF motor for the reference time period for which the user's eyelid is in the closed state, starting from when it is recognized that the user's eyelid has been closed, thus performing auto-focusing of an AF lens.

Also, before step S109 of performing the device driving control operation, the image processing apparatus 100 may sense shaking of the image processing apparatus 100. In this case, in step S109, the image processing apparatus 100 may correct the shaking using an OIS technique or a DIS technique for the reference time period for which the user's eyelid is in the closed state, starting from when it is recognized that the user's eye has been closed.

Also, in step S109, the image processing apparatus 100 may generate vibration for the reference time period for which the user's eyelid is in the closed state, starting from when it is recognized that the user's eyelid has been closed, thus removing foreign materials.

Then, when the reference time period for which the user's eyelid is in the closed state has elapsed (YES of S111), the image processing apparatus 100 may output the results of image processing by the device driving control operation through the display unit 170 (see FIG. 2) (S113).

Although not illustrated in FIG. 7, step S109 of performing the device driving control operation may further include counting time until the reference time period elapses, starting from when it is recognized that the user's eyelid has been closed, and notifying of a time when the user's eyelid will be again opened.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An electronic apparatus comprising:
   a photography lens that acquires an image signal from a subject;
   an eyeball recognition sensor that senses movement of a user's eyeball; and
   a controller that recognizes opening and closing of the user's eyelid based on eyeball monitoring information transmitted from the eyeball recognition sensor, and performs a device driving control operation for a reference time period for which the user's eyelid is in a closed state,
   wherein the controller comprises an eyeball movement period calculator that collects the eyeball monitoring information transmitted from the eyeball recognition sensor, and calculates the reference time period for which the user's eyelid is in the closed state, wherein the eyeball movement period calculator is configured to:
   collect information about time periods for which the user's eyelid is in an opened state and time periods for which the user's eyelid is in the closed state, in a predetermined time period,
   calculate an average value of the time periods for which the user's eyelid is in the closed state, and
   set the average value or an arbitrary value as the reference time period for which the user's eyelid is in the closed state.

2. The electronic apparatus according to claim 1, wherein the controller comprises:
   an operation processor that performs the device driving control operation for the reference time period for which the user's eyelid is in the closed state, when the controller recognizes that the user's eyelid is in the closed state based on the eyeball monitoring information transmitted from the eyeball recognition sensor.

3. The electronic apparatus according to claim 2, wherein the operation processor comprises:
   an Auto Focus (AF) lens driver that drives an AF motor for the reference time period for which the user's eyelid is in the closed state, when the controller recognizes that the user's eyelid is in the closed state.

4. The electronic apparatus according to claim 2, wherein the controller further comprises a shake sensor that senses shaking of the electronic apparatus.

5. The electronic apparatus according to claim 4, wherein the operation processor comprises a shake stabilizer that, when shaking of the electronic apparatus is sensed by the shake sensor, corrects the shaking of the electronic apparatus using an Optical Image Stabilization (OIS) technique or a Digital Image Stabilization (DIS) technique for the reference time period for which the user's eyelid is in the closed state, when the controller recognizes that the user's eyelid is in the closed state.

6. The electronic apparatus according to claim 2, wherein the operation processor comprises a foreign material remover that generates vibration for the reference time period for which the user's eyelid is in the closed state, when the controller recognizes that the user's eyelid is in the closed state.

7. The electronic apparatus according to claim 2, further comprising a timer that counts time from when the controller recognizes that the user's eyelid is in the closed state until the reference time period elapses, and notifies of a time when the user's eyelid is to be opened.

8. The electronic apparatus according to claim 2, further comprising an image update unit that outputs through the display unit image processing results of the device driving control operation that has been performed by the operation processor for the reference time period for which the user's eyelid is in the closed state, when the reference time period for which the user's eyelid is in the closed state has elapsed.

9. An image processing method comprising:
   setting a photographing mode on an electronic apparatus;
   sensing, by an eyeball recognition sensor, opening and closing of a user's eyelid;
   performing a device driving control operation for a reference time period for which the user's eyelid is in a closed state based on results of the sensing by the eyeball recognition sensor; and
outputting image processing results of the device driving control operation through a display unit, when the reference time period for which the user's eyelid is in the closed state has elapsed,
   after the sensing of the opening and closing of the user's eyelid and before the performing of the device driving control operation, further comprising:
   calculating an average value of time periods for which the user's eyelid is in an opened state and time periods for which the user's eyelid is in the closed state, in a predetermined time period; and
   setting the average value as the reference time period for which the user's eyelid is in the closed state.

10. The image processing method according to claim 9, wherein the performing of the device driving control operation comprises driving an Auto Focus (AF) motor for the reference time period for which the user's eyelid is in the closed state, when it is recognized that the user's eyelid is in the closed state.

11. The image processing method according to claim 9, before the performing of the device driving control operation, further comprising sensing shaking of the electronic apparatus,
   wherein the performing of the device driving control operation comprises correcting the shaking of the electronic apparatus using an Optical Image Stabilization (OIS) technique or a Digital Image Stabilization (DIS) technique for the reference time period for which the user's eyelid is in the closed state, when it is recognized that the user's eyelid is in the closed state.

12. The image processing method according to claim 9, wherein the performing of the device driving control operation comprises generating vibration for the reference time period for which the user's eyelid is in the closed state, when it is recognized that the user's eyelid is in the closed state.

13. The image processing method according to claim 9, wherein the performing of the device driving control operation further comprises:
   counting time from when it is recognized that the user's eyelid is in the closed state until the reference time period elapses; and
   notifying of a time when the user's eyelid is to be opened.

14. An electronic apparatus comprising:
   a photography lens that acquires an image signal from a subject;
   an eyeball recognition sensor that senses movement of a user's eyeball; and
   a controller that recognizes opening and closing of a user's eyelid based on eyeball monitoring information transmitted from the eyeball recognition sensor, and performs a device driving control operation from when the controller recognizes that the user's eyelid has been closed until the controller recognizes that the user's eyelid has been opened, wherein the controller comprises an eyeball recognition unit configured to:
   recognize that the user's eyelid has been closed when a degree by which the user's eyelid is closed is greater than a first reference value, based on eyeball monitoring information transmitted from the eyeball recognition sensor, and
   recognize that the user's eyelid has been opened when a degree by which the user's eyelid is opened is greater than a second reference value, after the controller recognizes that the user's eyelid has been closed.

15. The electronic apparatus according to claim 14, wherein the controller further comprises an operation processor that performs the device driving control operation from when the controller recognizes that the user's eyelid has been closed until the controller recognizes that the user's eyelid has been opened.

16. The electronic apparatus according to claim 15, further comprising an image update unit that outputs through a display unit image processing results of the device driving control operation performed by the operation processor, when the controller recognizes that the user's eyelid has been opened.

* * * * *